United States Patent [19]

Rung

[11] Patent Number: 4,704,983
[45] Date of Patent: Nov. 10, 1987

[54] FLOW METERING SIGHT GLASS

[75] Inventor: Robert Rung, Hopatcong, N.J.

[73] Assignee: Victaulic Company of America, Easton, Pa.

[21] Appl. No.: 772,871

[22] Filed: Sep. 4, 1985

[51] Int. Cl.[4] .............................................. G01F 23/02
[52] U.S. Cl. .................................... 116/276; 73/323; 73/332; 137/559
[58] Field of Search ...................... 116/276, 274, 275; 73/323, 324, 325, 331, 332; 137/559, 614.18; 251/309; 350/319

[56] References Cited

U.S. PATENT DOCUMENTS

| | | | |
|---|---|---|---|
| 820,922 | 5/1906 | Einsele | 116/276 |
| 1,176,503 | 3/1916 | Walker | 73/331 |
| 1,854,727 | 4/1932 | Alkire | 251/309 |
| 1,919,172 | 7/1933 | Schmitt | 116/276 |
| 2,570,322 | 10/1951 | Christopher | 116/276 |
| 2,585,290 | 2/1952 | Walker | 251/309 |
| 3,386,461 | 6/1968 | Fisher | 137/559 |
| 4,015,816 | 4/1977 | Semon | 251/309 |
| 4,064,826 | 12/1977 | Pauli | 116/276 |
| 4,171,711 | 10/1979 | Bake et al. | 251/309 |
| 4,221,470 | 9/1980 | Weeks | 73/323 |

FOREIGN PATENT DOCUMENTS

| | | | |
|---|---|---|---|
| 662623 | 7/1938 | Fed. Rep. of Germany | 116/276 |
| 840008 | 5/1952 | Fed. Rep. of Germany | 116/276 |
| 776269 | 1/1935 | France | 116/276 |

OTHER PUBLICATIONS

Cenco; Catalogue J-300; Stopcocks, Two-Way Straight Bore; p. 161; dated in Patent Office Nov. 1962.

Primary Examiner—Charles Frankfort
Assistant Examiner—Patrick R. Scanlon
Attorney, Agent, or Firm—Abelman Frayne Rezac & Schwab

[57] ABSTRACT

A metering sight glass is provided by a body of a transparent glass-like material having its ends polished to provide opposite viewing faces, the body being provided intermediate its length with dual axially aligned transverse passages, one of which provides a metering orifice, and the other of which provides a cavitation chamber positioned adjacent the metering orifice.

13 Claims, 7 Drawing Figures

FLOW METERING SIGHT GLASS

FIELD OF THE INVENTION

This invention relates to a sight glass used for observing the presence of fluid within a conduit.

BACKGROUND OF THE INVENTION

Sight glasses used for observing the presence of fluid within a conduit are well known. Typically, such sight glasses are comprised of a glass tube supported in a fitting with its bore open at its respective ends to the fluid supply and exhaust.

Another example of such a sight glass is illustrated in U.S. Pat. No. 2,744,487, issued May 8, 1956, the sight glass of this patent including spaced observation windows mounted in a fitting having an axial bore.

Such sight glasses have many uses, including their use in conjunction with fire extinguishing sprinkler systems, and, in particular as a means for observing water flow through a test line of such a system.

Typically, the test line is connected as a branch line to the upstream end of a feeder main of the sprinkler system, the feeder main carrying the individual sprinkler heads.

For the purpose of determining operativeness of the sprinkler system, and in particular of an alarm switch associated with the feeder main, the test line is provided with a test valve, which in turn is connected with a sight glass, the sight glass in turn being connected with a metering orifice exhausting to a drain line. The metering orifice is so dimensioned that, on opening of the test valve, a flow of water occurs in the test line simulating in volume with the flow of water through a single one of the smallest individual sprinkler heads when in the activated condition.

Thus, on opening of the test valve, a water flow occurs in the main feed simulating that which occurs on activation of a single sprinkler head, and, the water flow switch located upstream of the test line assumes an actuated position.

The sight glass is provided in order that water flow in the test line may be visually observed.

In the absence of such water flow, a condition which could occur as a consequence of the test valve being defective, or, by reason of blockage of the metering orifice or of the drain line, no indication can be obtained as to whether the water flow switch is operative or defective, or, whether the water flow switch is set for actuation at exactly the water flow produced by a single sprinkler head.

On opening of the test valve, the sight glass only momentarily provides an indication of the commencement of the water flow, for it is immediately filled with a solid core of water. Such a solid core of water is not readily distinguishable from an empty sight glass, particularly in poor light, or, if the sight glass is dirty.

SUMMARY OF THE INVENTION

It is an object of this invention to provide a sight glass which avoids the problems of prior constructions, and which, additionally, eliminates the requirement for a separate metering orifice.

According to the present invention, the sight glass is provided by a solid cylinder of a glass-like transparent material arranged with its axis transverse to the direction of water flow.

The ends of the solid cylinder are formed either as polished planar surfaces, or, as the srufaces of magnifying or light collecting lenses.

Intermediate at the ends of the solid cylinder, the sight glass is provided with a stepped transverse bore extending completely through the solid cylinder, and which provides a metering orifice, and a cavitation chamber adjacent and preferably co-axial with the metering orifice.

Optionally, the metering orifice is provided directly in the solid cylinder. Alternatively, the metering orifice is provided in one of a plurality of orifice plates calibrated to the sprinkler heads employed in the system, and, one of which is positioned within the metering orifice.

In use of the sight glass, the solid cylinder is positioned within a fitting provided with connections to the test valve and to the drain line, and is positioned with the metering orifice upstream of the cavitation chamber and in direct communication with the test valve.

The ends of the solid cylinder are exposed externally of the fitting in order that light can enter the cylinder, and the metering orifice and the cavitation chamber can be observed axially of the cylinder from either end thereof.

On actuation of the test valve, water passes through the metering orifice, at which time the water will be under the full line pressure of the feed main.

Immediately upon leaving the test orifice and, upon entering the cavitation chamber, the metered flow of water is subjected to an abrupt drop in pressure. This abrupt drop in pressure causes cavitation in the water flow from the metering orifice, assisted by release of dissolved air in the water flow, thus making the water flow readily visible, and without question as to its presence.

The water flow into the cavitation chamber readily can be observed through the axial ends of the solid cylinder. There is also the opportunity of observing the water flow through one end of the solid cylinder, and back lighting the water flow from the opposite end of the solid cylinder.

As is disclosed in co-pending application Ser. No. 772,993 filed Sept. 4, 1985, now U.S. Pat. No. 4,643,224, the solid cylinder can be rotatably mounted within the supporting fitting in order for it to provide a plug valve, thus incorporating the metering orifice, sight glass, and the test valve into a single unitary structure.

DESCRIPTION OF THE DRAWINGS

The invention will now be described with reference to the accompanying drawings, which illustrate preferred embodiments of the invention, and in which.

DESCRIPTION OF THE PREFERRED EMBODIMENTS

Figure 1:
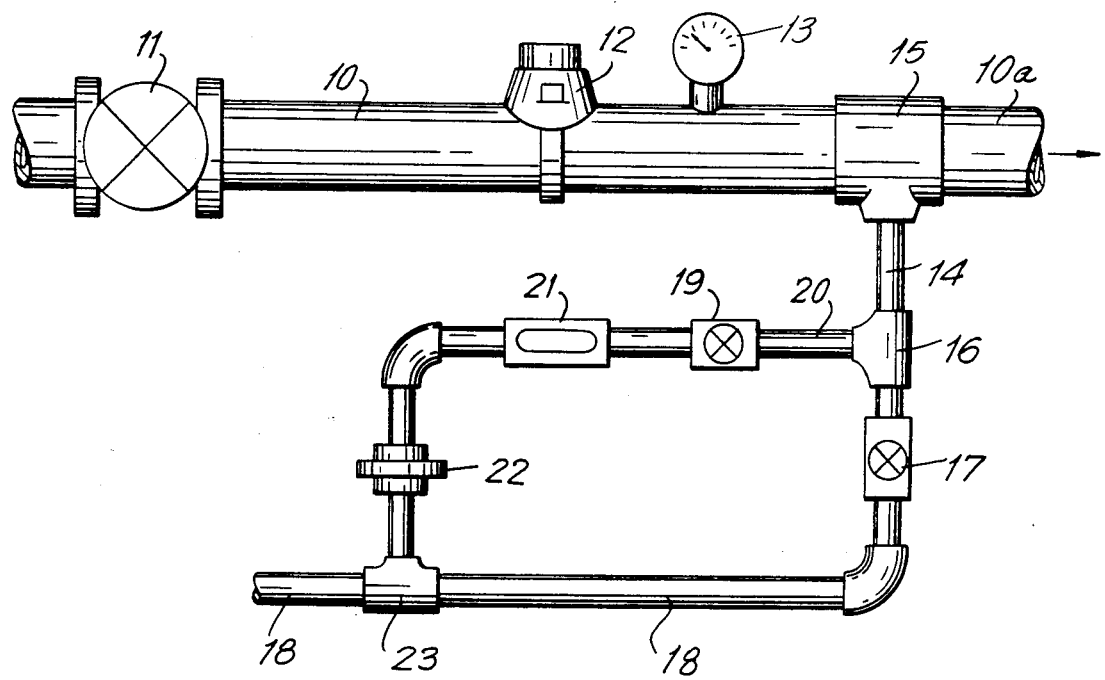
FIG. 1, which is labelled PRIOR ART illustrates a typical alarm testing system of a sprinkler system.

Before discussing the preferred embodiments, reference is made to FIG. 1 of the drawings which illustrates a typical prior art test system as at present commonly in use.

THE PRIOR ART

In FIG. 1 the main feed is shown at 10, the main feed being controlled by a main valve 11. The sprinkler heads (not shown) are connected to the downstream end 10a of the main feed.

Downstream of the main valve 11 and coupled with the main feed 10, is a water flow switch 12, which is actuated by water flow in the main feed 10, and is connected to actuate an alarm (not shown). The water flow switch 12 is set to close immediately there is a flow in the main feed corresponding with the opening of a single one of the sprinkler heads.

A pressure gage 13 may be provided for indicating static water pressure in the main feed 10, and for indicating pressure drop resulting from the opening of one or more of the sprinkler heads.

A test line 14 is connected to the main feed 10 by means of a T-branch 15. The test line 14 is in turn connected to a drain valve 17 by way of a T-branch 16, and is in turn connected to a drain line 18.

The T-branch 16 also connects with a test valve 19 in a test line 20, in which are serially arranged the test valve 19, a sight glass 21, and a metering orifice 22. The test line 20 terminates in a T-branch 23 providing a connection with the drain line 18.

In order to test the water flow switch 12, and prove the alarm system, the test valve 19 is opened to permit a flow of water through the sight glass 21 and through the metering orifice 22, the metering orifice acting to restrict the flow to that which would occur upon the opening of a single sprinkler head.

The sight glass 21 is provided, more particularly, in order that water flow through the test line 20 can be confirmed, there being the possibility that the test valve 19 is defective, or, the metering orifice is blocked or partially blocked, or, that the drain line 18 itself is blocked. Any one of these conditions would give a faulty test indication leading to the conclusion that the water flow switch 12 is defective, or, that the alarm is defective.

Over extended periods of time, the sight glass 21 will become dirty or clouded, this making it difficult to read, and, making it difficult to differentiate between an empty sight glass and one which is filled with a solid core of water. Further, the transition between the empty and full condition of the sight glass is almost instantaneous, and can be missed by the person making the test.

THE PREFERRED EMBODIMENTS

Figure 2:
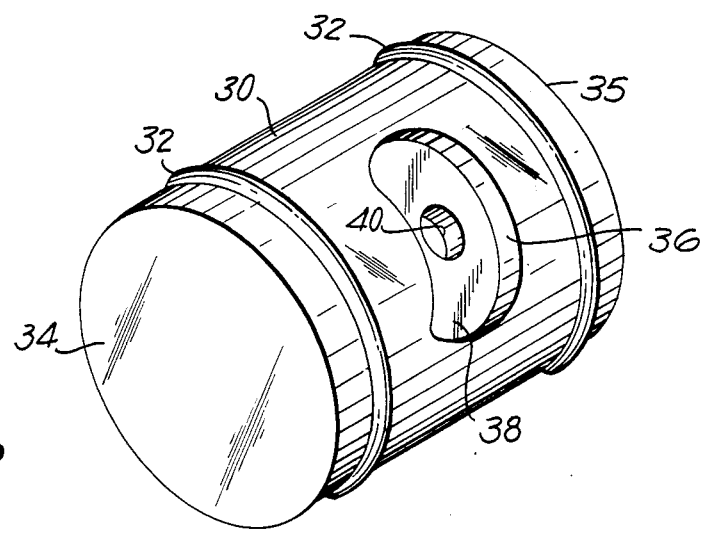
FIG. 2 is a perspective view of the metering sight glass of the present invention.
Figure 3:
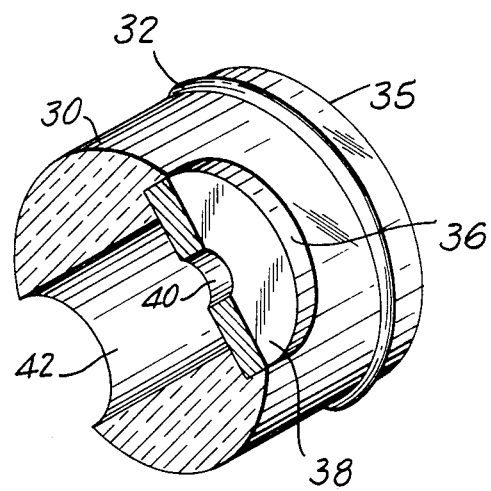
FIG. 3 is a fragmentary sectional view corresponding with FIG. 2, and showing the metering orifice and cavitation chamber in cross-section.
Figure 4:
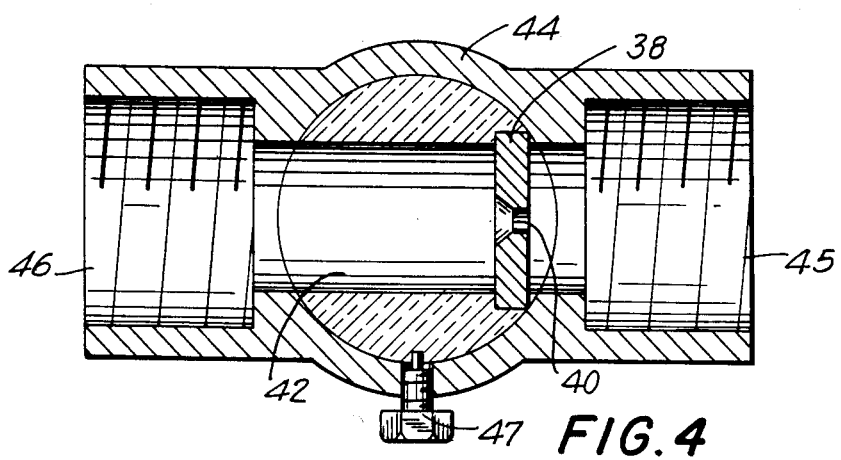
FIG. 4 is a cross-section of the flow metering sight glass of the present invention when incorporated into a fitting.

Referring now to FIGS. 2 through 4, there is illustrated a sight glass that eliminates the disadvantages of known sight glasses, and which at the same time permits the metering orifice to be incorporated directly into the sight glass, thus effecting an extreme simplification of the test line, and a very substantial reduction in the number of independent components and fittings required for assembly of the test line.

As is illustrated in FIG. 2, the combined sight glass and metering orifice is provided in a solid cylinder 30 of a transparent plastics material, such as methyl acrylate, or other suitable plastics material of glass-like characteristics. The solid cylinder 30 equally well can be a molding or casting of glass, or provided by a section of glass rod.

While the form of a solid cylinder is preferred, in that it readily lends itself to sealing by O-rings 32, such is not essential to the present invention. The body equally well can be of any solid form, the sole requirement being that it have spaced end faces 34, 35 providing viewing through the body in the direction of its longitudinal axis. For example, the solid cylinder 30 equally well could be square, rectangular, or polyhedral in cross-section.

Figure 7:
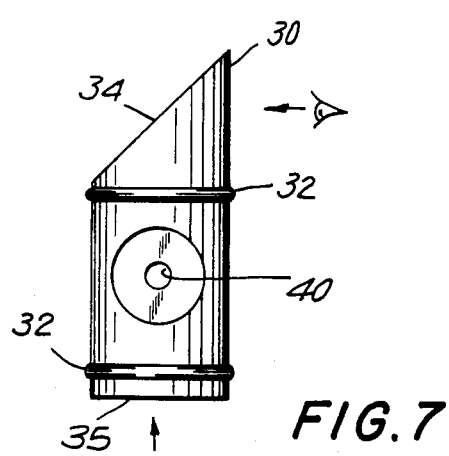
FIG. 7 illustrates and alternative form of the metering sight glass of the invention.

Preferably the end faces 34 and 35 are polished planar surfaces, in order to further facilitate viewing through the body from either axial end thereof. Optionally, the end faces 34 and 35 are in the form of polished lens surfaces providing for a magnification of the interior of the cylinder. Also, optionally, one of the end faces 34 can be arranged at an oblique angle to the axis of the cylinder, as shown in FIG. 7, in order to provide for viewing of the cylinder interior by internal reflection from the back of the face 34, and from a position laterally of the cylinder axis. This is of particular utility in tight or confined locations in which axial viewing of the cylinder is either impractical or impossible.

Intermediate the end faces 34 and 35, the cylindrical body 30 is provided with axially aligned co-axial passages extending diametrically through the body.

The first of these passages 36 extends into the body from the exterior thereof, and provides a seating for a circular plate 38 having a metering orifice 40. Preferably the plate 38 is removably received within the passage 36, in order that it can be readily removed and replaced by a plate having an orifice 40 of a different size, and the particular plate employed inspected from the exterior of the sight glass without disassembling the sight glass or removing it from its housing. In this way, the metering orifice can be easily modified for it to match the flow rate of any one of a number of different sprinkler heads of different flow rates. Further, preferably a plurality of colored or otherwise coded metering plates 38 will be supplied with a sight glass, in order that the user may select that metering plate appropriate to the particular sprinkler heads employed in the system. Optionally, the opposite faces of the plates 8 can be other than planar and parallel, in order to further enhance cavitation of the exiting water, for example, in the form of a disc nozzle, as shown in FIG. 4.

Immediately adjacent the first passage 36, and connected therewith, is a second passage 42 which opens directly through the opposite side of the cylindrical body 30. The purpose of the second passage 42 is to provide a cavitation chamber into which the metering orifice 40 can discharge. The second passage 42 is shown in FIGS. 3 and 4.

While the sight glass can be mounted in any one of a number of ways, for convenience of illustration, it is shown in FIG. 4 as being received within a fitting 44 having connections 45 and 46 to the test valve 19, and to the drain line 18, respectively. The sight glass is received in a transverse bore in the fitting 44, and sealed by the O-rings 32, the sight glass being held against axial displacement in any convenient manner, such as by a grub screw 47.

In use of the sight glass, the test valve 19 is opened, thus admitting water into the connection 45. A metered flow of water then passes through the metering orifice 40 as a solid stream.

Immediately upon exiting the metering orifice 40, the water flow is subjected to a sharp and abrupt pressure drop as it enters into the cavitation chamber 42. This sudden drop in pressure causes cavitation in the water flow, as further assisted by the release of dissolved air in the water to produce an aerated connical jet of water droplets passing into and through the cavitation chamber 42. The jet entering the cavitation chamber is at relatively high velocity and thus has the capability of washing and jet scrubbing the walls of the cavitation chamber.

The cavitation chamber can readily be viewed through either one of the end faces 34 or 35, there being the opportunity of illuminating the interior of the sight glass from the opposite end face using a flashlight or utility light. This is particularly useful, in that commonly such test systems are concealed in dark and somewhat inaccesible places.

When so viewed, the presence of the metered water flow is readily confirmable, the presence of the water droplets and entrained air providing a highly distinctive appearance to the water flow that is entirely different from either an empty sight glass, or, one which is filled with a solid core of water. Further, this distinctive appearance is maintained throughout the entire test run, and can be observed at any time during the test run, there being no requirement for the workmen to closely observe the sight glass at the beginning of the test run. Further, by providing this distinctive appearance to the exiting metered water flow, the requirement for mechanical devices such as vanes, paddles, water screws or the like is obivated as unnecessary.

Figure 5:
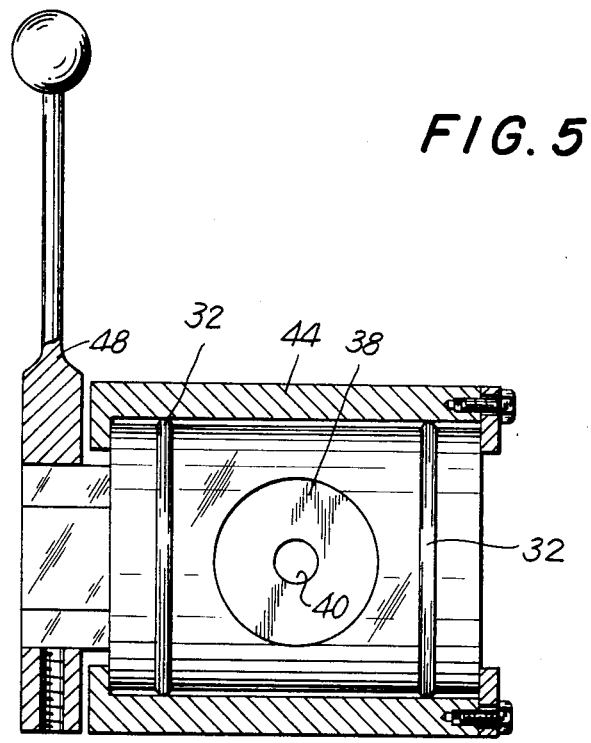
FIG. 5 is a longitudinal section through such a fitting also showing in modification thereof.

As is disclosed in co-pending patent application Ser. No. 772,993, filed Sept. 4, 1985, now U.S. Pat. No. 4,643,224, and as is illustrated in FIG. 5, the cylindrical metering sight glass of the present invention is readily employable as a plug vlave, such that it can additionally provide the function of the test valve 19, with consequential elimination of the test valve 19. In order to accomplish this function, it is only necessary for the sight glass to be provided with a control handle 48, and to mount the sight glass in the fitting 44 in a manner permitting rotation thereof.

Figure 6:
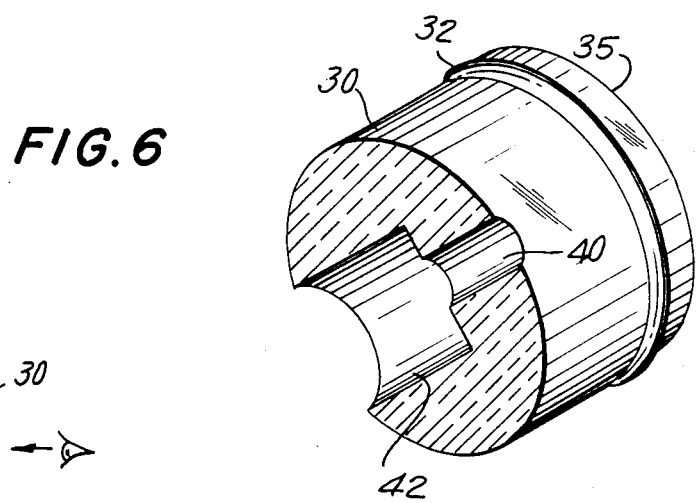
FIG. 6 is a fragmentary perspective view showing an alternative form of the metering sight glass of the present invention.

FIG. 6 illustrates a simplified construction of the sight glass, in which the metering plate 38 is omitted, and, the metering orifice 40 is provided directly in the body of the sight glass. As the metering oriface can be observed directly through the sigh glass, its size can be readily determined by viewing through the sight glass, and if desired be identified by printing on one of the faces of the sight glass.

It will be appreciated that the various modifications may be made within the scope of the appended claims.

I claim:

1. A flow metering and flow indicating sight glass for use in a plumbing fixture having an open-ended bore extending completely therethrough, and with which input and outlet passages communicate at positions intermediate the axial ends of said bore, said sight glass including:

a solid cylinder of transparent glass-like material receivable within said bore in sealed relation therewith;

said solid cylinder having axially opposed end faces extending transversely of the longitudinal axis of said cylinder, at least one of said end faces providing a viewing face through which the interior of said solid cylinder can be viewed;

a metering passage providing a metering orifice formed within said solid cylinder and for communication with said inlet passage of said fitting; and a cavitation chamber formed directly within said solid cylinder and into which said metering passage discharges, said cavitation chamber being formed for communication with said outlet passage of said fitting;

said metering passage and said cavitation chamber being arranged in series relationship, and extending through the body of said solid cylinder transversely to the longitudinal axis thereof;

whereby the presence of fluid exiting said metering passage can be visually confirmed by inspection through said viewing face, and, the presence of actual flow-through said metering passage can be visually confirmed by inspection through said viewing face of cavitation occuring in said cavitation chamber of fluid exiting said metering passage.

2. The sight glass of claim 1, in which said viewing face extends substantially perpendicular to the longitudinal axis of said solid cylinder.

3. The sight glass of claim 2, including a second viewing face at the opposite end of said solid cylinder and extending substantially perpendicular to the longitudinal axis of said solid cylinder.

4. The sight glass of claim 1, in which said viewing face is a polished planar viewing face.

5. The sight glass of claim 1, in which said viewing face is a polished lens surface.

6. The sight glass of claim 1, in which said viewing face extends substantially perpendicular to the longitudinal axis of said solid cylinder.

7. The sight glass of claim 1, in which said viewing face extends at an oblique angle to the longitudinal axis of said solid cylinder.

8. The sight glass of claim 1, in which the longitudinal axes of said metering passage and said cavitation chamber intersect the longitudinal axis of said solid cylinder.

9. The sight glass of claim 1, including O-rings positioned in grooves adjacent the respective axial ends of said solid cylinder, and which provide for sealing of said solid cylinder within said bore of said fitting.

10. The sight glass of claim 9, in which said solid cylinder comprises the plug of a plug valve.

11. The sight glass of claim 10, including a manipulating handle attached to said solid cylinder for rotating said solid cylinder about its longitudinal axis.

12. The metering sight glass of claim 1, including a plate removably received within said metering passage and providing a metering orifice, thus permitting ready replacement of said plate by a similar plate having a metering orifice of different flow characteristics to the flow characteristics of said first mentioned plate.

13. The metering sight glass of claim 12, in which each said plate is color-coded differently from each other plate.

* * * * *